(12) United States Patent
Bhat et al.

(10) Patent No.: US 11,988,901 B2
(45) Date of Patent: May 21, 2024

(54) TWO-EYE TRACKING BASED ON MEASUREMENTS FROM A PAIR OF ELECTRONIC CONTACT LENSES

(71) Applicant: Tectus Corporation, Saratoga, CA (US)

(72) Inventors: Abhishek Deepak Bhat, Santa Clara, CA (US); Ramin Mirjalili, San Jose, CA (US); Morrison Ulman, Los Altos, CA (US); Sheng Wan, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 359 days.

(21) Appl. No.: 17/244,615

(22) Filed: Apr. 29, 2021

(65) Prior Publication Data

US 2022/0350167 A1 Nov. 3, 2022

(51) Int. Cl.
*G02C 7/04* (2006.01)
*G02C 7/10* (2006.01)

(52) U.S. Cl.
CPC .............. *G02C 7/048* (2013.01); *G02C 7/10* (2013.01)

(58) Field of Classification Search
CPC .......... G02C 7/048; G02C 7/10; G02C 11/10; G02C 7/04; G02C 7/049; G02B 27/0093; G06F 3/013; G06F 3/0346; A61B 3/113
See application file for complete search history.

(56) References Cited

U.S. PATENT DOCUMENTS

| | | | |
|---|---|---|---|
| 10,342,424 B2 | 7/2019 | Ho | |
| 10,353,219 B1 | 7/2019 | Hannaford | |
| 2009/0189830 A1* | 7/2009 | Deering | G09G 3/02 |
| | | | 345/1.3 |
| 2014/0240656 A1* | 8/2014 | Pugh | G02C 7/083 |
| | | | 623/6.22 |
| 2014/0285429 A1 | 9/2014 | Simmons | |
| 2015/0261294 A1* | 9/2015 | Urbach | G02C 7/101 |
| | | | 351/158 |
| 2017/0270636 A1 | 9/2017 | Shtukater | |
| 2017/0354328 A1* | 12/2017 | Ho | A61B 3/0025 |
| 2018/0088351 A1 | 3/2018 | Kennedy | |
| 2018/0136492 A1* | 5/2018 | An | H10N 30/30 |
| 2018/0335836 A1* | 11/2018 | Miller | G02C 11/10 |

(Continued)

OTHER PUBLICATIONS

International Search Report and Written Opinion for Application No. PCT/US2022/022079.

(Continued)

*Primary Examiner* — Darryl J Collins
*Assistant Examiner* — Matthew Y Lee
(74) *Attorney, Agent, or Firm* — Amsel IP Law PLLC; Jason Amsel (57) ABSTRACT

A system includes a pair of electronic contact lenses that obtain respective motion sensor measurements in response to eye movements. A tracking module derives estimated orientations for both eyes based on the sensor measurements and a set of correlations and constraints that describe human eye movement. The model describes the limited number of ways that an individual eye can move and relationships between relative movement of the left and right eye. The tracking module performs filtering based on the measurements and the eye model to suppress noise and generate orientation estimates for both eyes.

17 Claims, 10 Drawing Sheets

(56) References Cited

U.S. PATENT DOCUMENTS

| | | | | |
|---|---|---|---|---|
| 2019/0353926 | A1* | 11/2019 | Toner | G02C 7/041 |
| 2020/0093366 | A1 | 3/2020 | Toner | |
| 2020/0096786 | A1* | 3/2020 | Toner | G01P 15/18 |
| 2021/0026444 | A1* | 1/2021 | Haine | G02B 27/017 |

OTHER PUBLICATIONS

"Relative Orientation of Primary Positions of theTwo Eyes", P. BRUNO and A. V. van den BERG, Vision Research, vol. 37, No. 7, p. 935-947, 1997.

"A kinematic model for 3-D head-free gaze-shifts", Mehdi Daemi and J. Douglas Crawford, Frontiers in Computational Neuroscience, vol. 9, Article72, p. 1-18, 2015.

"Dynamics of Human Head and Eye Rotations Under Donders' Constraint", Bijoy K. Ghosh and Indika B. Wijayasinghe, IEEE Transactions on Automatic Control, vol. 57, No. 10, p. 2478-2489, 2012.

"On the role of ocular torsion in binocular visual matching", Bernhard J. M. Hess, Nature Scientific Reports, 8:10666 | DOI:10.1038/s41598-018-28513-8, 2018, 12 pages.

"The coordination of binocular eye movements: Vertical and torsional alignment", James S. Maxwell and Clifton M. Schor, Vision Research v. 46, p. 3537-3548, 2006.

"Neural Constraints on Eye Motion in Human Eye-Head Saccades", H. Misslisch, D. Tweed, and T. Vilis, Journal of Neurophysiology, p. 859-869, Mar. 1998.

"Three-dimensional ocular kinematics underlying binocular single vision", Bernhard J. M. Hess and H. Misslisch, J Neurophysiol, v. 116, p. 2841-2856, 2016.

"A geometric method for computing ocular kinematics and classifying gaze events using monocular remote eye tracking in a robotic environment", Tarkeshwar Singh, Christopher M. Perry and Troy M. Herter, Journal of NeuroEngineering and Rehabilitation, 13:10, 2016, 17 pages.

"A Visual Test of Listing's Law During Vergence", Rizwan A. B. Somani, Masters Thesis, The University of Western Ontario, 1997, 92 pages.

"Listing's Law: Clinical Significance and Implications for Neural Control", Agnes M.F. Wong, Survey of Ophthalmology, vol. 49, No. 6, p. 563-575, 2004.

* cited by examiner

RIGHT EYE LENS        110        LEFT EYE LENS

| Sensors (R) 410 |
|---|
| Accelerometer 402 |
| Magnetometer 404 |
| Gyroscope 406 |
| Femtoimager 408 |

| Sensors (L) 410 |
|---|
| Accelerometer 402 |
| Magnetometer 404 |
| Gyroscope 406 |
| Femtoimager 408 |

| State vector (R) 420 |
|---|
| yaw 422 |
| pitch 424 |
| roll 426 |

| State vector (L) 420 |
|---|
| yaw 422 |
| pitch 424 |
| roll 426 |

TWO-EYE TRACKING BASED ON MEASUREMENTS FROM A PAIR OF ELECTRONIC CONTACT LENSES

BACKGROUND

1. Technical Field

This disclosure relates generally to eye tracking using measurements from a pair of electronic contact lenses.

2. Description of Related Art

An electronic contact lens may include various integrated electronic components such as projectors, imaging devices, sensors, and batteries. These electronic contact lenses can be utilized for various virtual reality or augmented reality applications in which images are projected by the electronic lenses onto the user's retinas to replace or augment the user's view of the external environment. Integrated sensors in such electronic contact lenses may furthermore measure motion data associated with eye movements. If estimated accurately, this motion data is useful to track estimated eye position in order to determine where to position projected images or to perform other functions.

DETAILED DESCRIPTION

A system includes a pair of electronic contact lenses that obtain respective motion sensor measurements in response to eye movements. A tracking module derives estimated orientations for both eyes based on the sensor measurements and a set of correlations and constraints that describe human eye movement. This model accounts for the principles that an individual eye can move in only a limited number of ways and that left and right eye motions are not independent. The tracking module is therefore able to provide more accurate tracking than single eye models which ignore the correlations and constraints governing the relative motions of the left and right eyes. Furthermore, by combining multiple sensor measurements according to a two-eye model, the tracking module naturally filters out noise in the sensor measurements.

One approach to the orientation estimation model applies a filter (such as a Kalman filter) to sensor measurements from both electronic contact lenses to jointly estimate orientations of the left and right eyes. The filter is designed to output the estimates based on both the sensor measurements and the modeled correlations and constraints governing relative eye motion.

In another approach, the system applies separate filters to the respective sensor measurements from each electronic contact lens to independently estimate orientations of each eye using a single eye model. The estimates are then adjusted based on the set of constraints and correlations governing two-eye movement.

Various actions can be initiated based on orientation tracking of the left and right eyes. For example, virtual objects projected by the electronic contact lenses can be positioned and rotated to compensate for detected eye movements so that a stable image is perceived by the user. Furthermore, alignment of augmented reality images projected by respective femtoimagers may be rotated to compensate for estimated relative roll between the left and right eyes. In another example, an optical power of a variable focus of the electronic contact lenses may be configured based on estimated vergence between the left and right eyes. Eye gestures may furthermore be detected based on the respective estimated orientations to perform various functions associated with an augmented reality environment such as selecting virtual menu items or controlling an externally linked device.

Figure 1A:
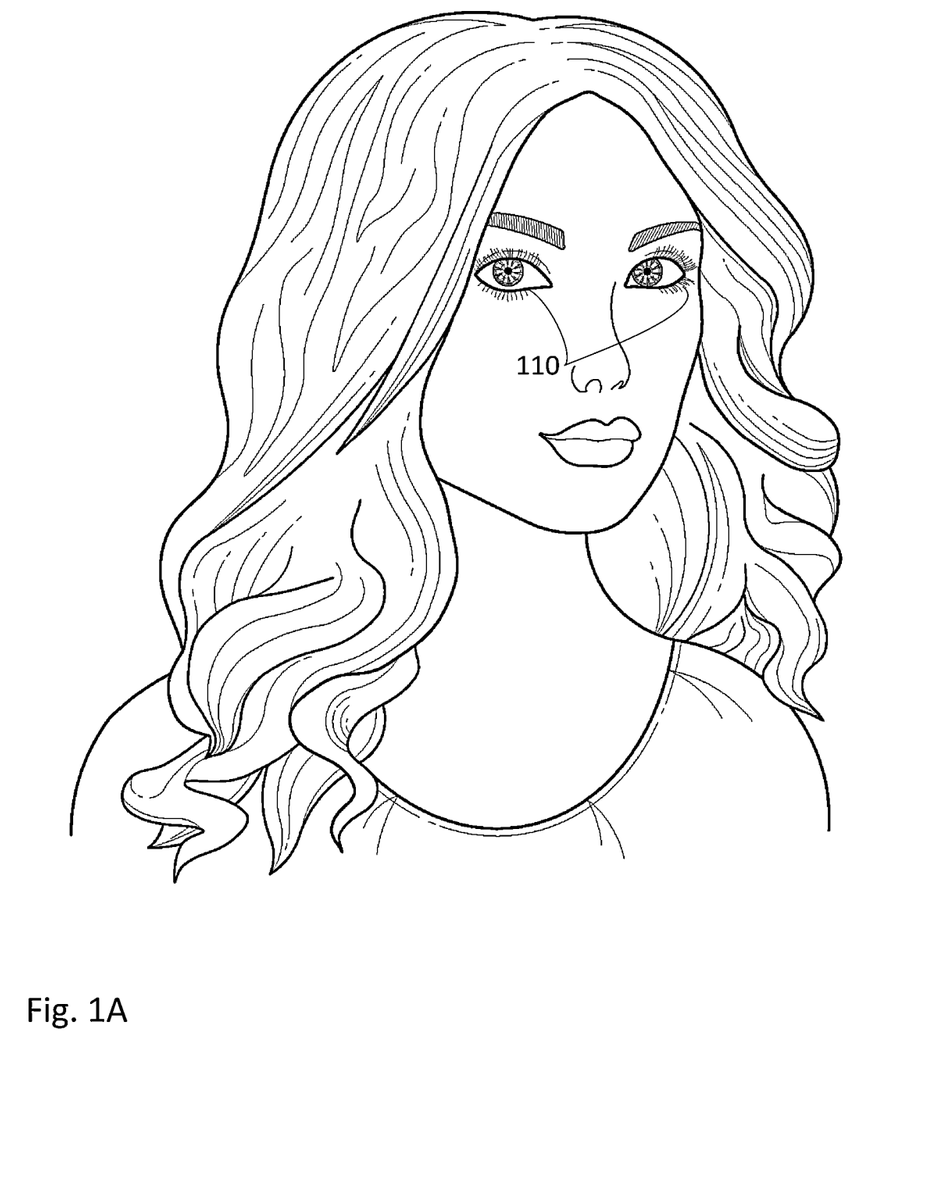
FIG. 1A shows a user wearing an electronic contact lens containing a projector (femtoprojector) and an imaging device (femtoimager).
Figure 1B:
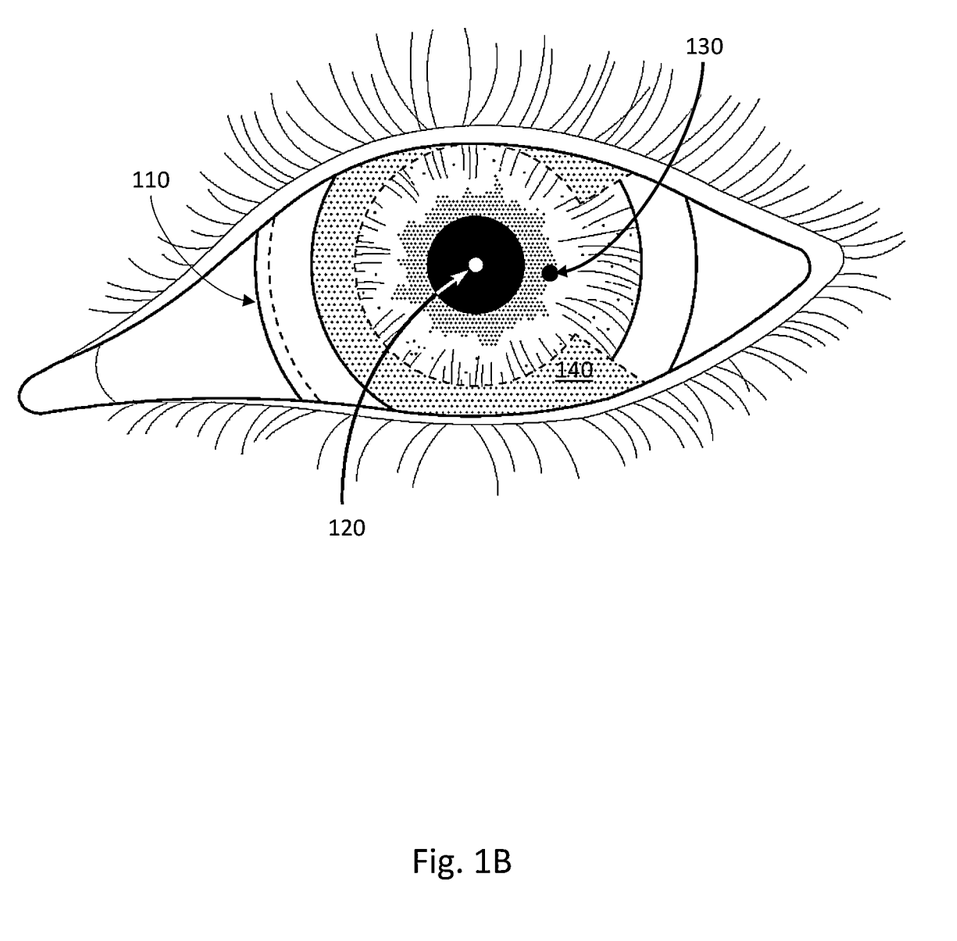
FIG. 1B shows a magnified view of the electronic contact lens mounted on the user's eye.
Figure 1C:
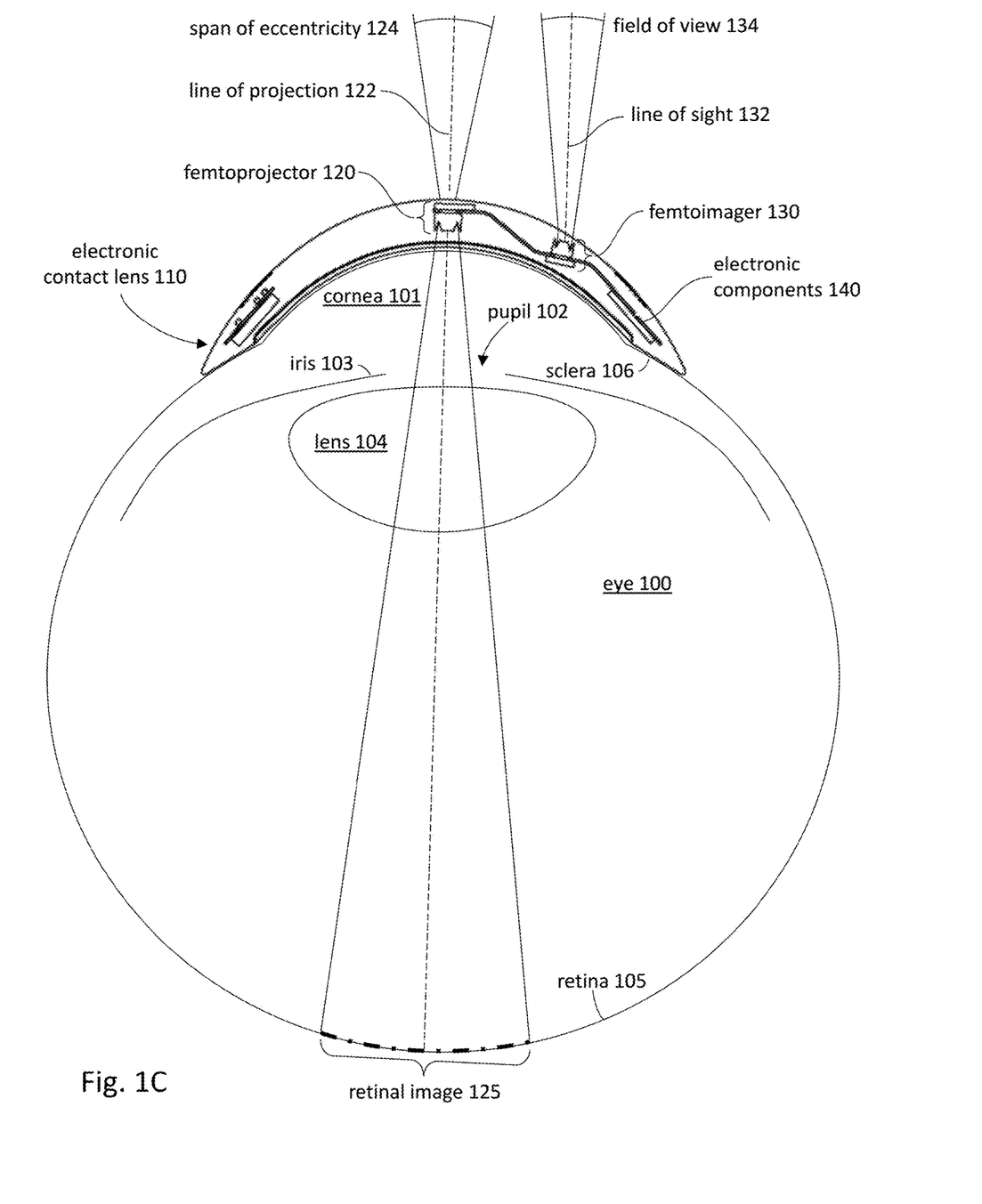
FIG. 1C shows a cross sectional view of the electronic contact lens mounted on the user's eye.

FIG. 1A shows a user wearing a pair of electronic contact lenses 110. FIG. 1B shows a magnified view of one of the electronic contact lenses 110, and FIG. 1C shows a cross sectional view of the electronic contact lens 110. The electronic contact lens 110 is worn on the surface of the user's eye. The following examples use a scleral contact lens in which the contact lens is supported by the sclera of the user's eye, but the contact lens does not have to be scleral.

As shown in FIG. 1B, the electronic contact lens 110 contains a femtoprojector 120 and a femtoimager 130. The femtoprojector 120 is a small projector that projects images inward onto the user's retina. It is located in a central region of the contact lens 110, so that light from the femtoprojector 120 propagates through the user's pupil to the retina. The femtoprojector 120 typically includes an electronics backplane (e.g., driver circuitry), a frontplane of light emitting elements (e.g., an LED array) and projection optics. The frontplane produces an image (referred to as the source image), which is optically projected by the projection optics through the various eye structures and onto the retina 105, as shown in FIG. 1C.

The femtoimager 130 is a small imager that is outward facing and captures images of the external environment. In this example, it is located outside the central region of the contact lens 110 so that it does not block light from entering the user's eye. The femtoimager 130 typically includes imaging optics, a sensor array and sensor circuitry. The imaging optics images a portion of the external environment onto the sensor array, which captures the image. The sensor array may be an array of photosensors. In some embodiments, the sensor array operates in a visible wavelength band (i.e., ~390 nm to 770 nm). Alternatively or additionally, the sensor array operates in a non-visible wavelength band, such as an infrared (IR) band (i.e.,~750 nm to 10 μm) or an ultraviolet band (i.e., <390 nm). For example, the sensor array may be a thermal infrared sensor.

The lead line from reference numeral 110 in FIG. 1B points to the edge of the contact lens. The femtoprojector 120 and femtoimager 130 typically are not larger than 2 mm wide. They may fit within a 2 mm×2 mm×2 mm volume.

The electronic contact lens 110 also includes other electronic components 150, which may be mounted on a flexible bus 140 located in a peripheral zone. Electronic components 150 in the lens 110 may include microprocessors/controllers, inertial sensors (such as accelerometers and gyroscopes), magnetometers, radio transceivers, power circuitry, antennas, batteries and elements for receiving electrical power inductively for battery charging (e.g., coils). Sensed data from the inertial sensors and magnetometer may be combined to estimate parameters such as position, velocity, acceleration, orientation, angular velocity, angular acceleration or other motion parameters. For clarity, connections between the femtoprojector 120, femtoimager 130 and electronics components 150 are not shown in FIG. 1B. The flexible bus 140 may optionally be cut out, for example on the temporal (as opposed to nasal) side of the electronic contact lens 110 as shown in FIG. 1B. The electronic contact lens 110 may include cosmetic elements, for example covering the electronic components 150s on the flexible bus 140. The cosmetic elements may be surfaces colored to resemble the iris and/or sclera of the user's eye.

FIG. 1C shows a cross sectional view of the electronic contact lens mounted on the user's eye. For completeness, FIG. 1C shows some of the structure of the eye 100, including the cornea 101, pupil 102, iris 103, lens 104, retina 105 and sclera 106. The electronic contact lens 110 preferably has a thickness that is less than two mm. The contact lens 110 maintains eye health by permitting oxygen to reach the cornea 101.

The femtoimager 130 is outward-facing, so that it "looks" away from the eye 100 and captures images of the surrounding environment. The femtoimager 130 is characterized by a line of sight 132 and a field of view 134, as shown in FIG. 1C. The line of sight 132 indicates the direction in which the femtoimager 130 is oriented, and the field of view 134 is a measure of how much of a scene the femtoimager 130 captures. If the femtoimager 130 is located on the periphery of the electronic contact lens 110, the contact lens surface will be sloped and light rays will be bent by refraction at this interface. Thus, the direction of the line of sight 132 in air will not be the same as the direction within the contact lens material. Similarly, the angular field of view 134 in air (i.e., the external environment) will not be the same as the angular field of view in the contact lens material. The terms line of sight 132 and field of view 134 refer to these quantities as measured in the external environment (i.e., in air).

The femtoprojector 120 projects an image onto the user's retina 105. This is the retinal image 125 shown in FIG. 1C. This optical projection from femtoprojector 120 to retina 105 is also characterized by an optical axis, as indicated by the dashed line within the eye in FIG. 1C, and by some angular extent, as indicated by the solid lines within the eye in FIG. 1C. However, the femtoprojector 120 typically will not be described by these quantities as measured internally within the eye 100. Rather, it will be described by the equivalent quantities as measured in the external environment. The retinal image 125 appears as a virtual image in the external environment. The virtual image 125 has a center, which defines the line of projection 122 for the femtoprojector 120. The virtual image 125 will also have some spatial extent, which defines the "span of eccentricity" 124 for the femtoprojector 120. As with the femtoimager line of sight 132 and field of view 134, the terms line of projection 122 and span of eccentricity 124 for the femtoprojector 120 refer to these quantities as measured in the external environment.

The femtoimager 130 and femtoprojector 120 both move together with the eye 100 because the electronic contact lens 110 is physically mounted to the eye 100. Thus, images captured by the femtoimager 130 naturally have a line of sight 132 corresponding to the user's gaze direction and virtual images projected by the femtoprojector 120 naturally move together with the eye 100.

Figure 2:
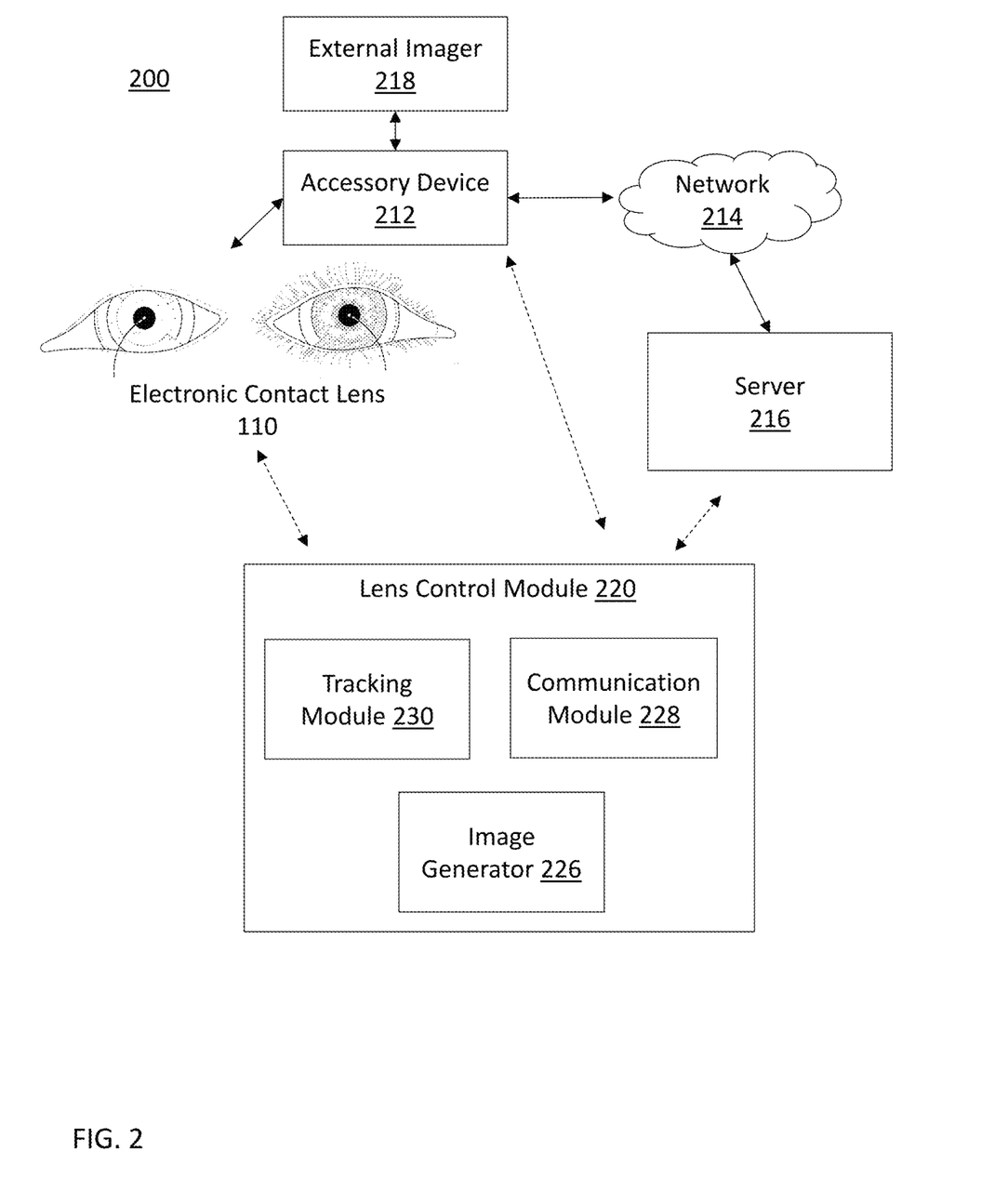
FIG. 2 is a block diagram of an augmented reality system for an electronic contact lens.

FIG. 2 shows a block diagram of an augmented reality system 200 that performs various functions based on orientation tracking of a pair of electronic contact lenses 110 worn on the left and right eyes. The augmented reality system 200 includes the electronic contact lenses 110, as described above, an accessory device 212, a network 214, a server 216 and an external imager 218. The accessory device 212 is a computing device that is communicatively coupled to one or both of the electronic contact lenses 110 (e.g., via a wireless interface) and performs computing or storage functions that support operation of the electronic contact lenses 110. The accessory device 212 may be embodied as an electronic wearable device (e.g., necklace, headband, waistband, etc.), smartphone, smart-watch or another device. The accessory device 212 may also be connected to a server 216 via a network 214. The server 212 provides access to various information relevant to operation of the electronic contact lenses 110 and may furthermore provide additional computing or storage functions that support operation of the electronic contact lenses 110. The accessory device 212 may also optionally be coupled to an external imager 218. The external imager 218, if present, captures images of the external environment and may be used to supplement images captured by the femtoimager 130 of the electronic contact lenses 110. The external imager 218 may capture images having a wider field of view, higher resolution or other improved image characteristics relative to the images captured by the femtoimager 130.

A lens control module 220 interfaces with the electronic contact lenses 110 to perform orientation tracking and to initiate various actions in response to orientation sensing. Various components of the lens control module 220 may be implemented in whole or in part on one or more of the electronic contact lenses 110, on the accessory device 212, on the server 216 or a combination thereof. In some implementations, certain time-sensitive functions of the lens control module 220 may be implemented directly on the electronic contact lenses 110 for low latency while other more computationally intensive functions may be offloaded to the accessory device 212 or to the server 216 to enable the electronic contact lenses 110 to operate with relatively light computational and storage requirements. For example, in one implementation, the electronic contact lenses 110 transfers images captured by the femtoimager 130 to the accessory device 212 for performing image processing tasks. The accessory device 212 may perform these functions directly or may offload the functions in whole or in part to the server 216. Alternatively, the electronic contact lens 110 may perform some lightweight initial processing on the images prior to offloading them to the accessory device 212. For example, one or both of the electronic contact lenses 110 may compress images or extract features from the images and send the compressed images or features to the accessory device 212 for processing instead of transferring the raw images. The task of generating virtual images for displaying on the electronic contact lenses 110 can furthermore be performed in whole or in part on the accessory device 212 or the server 216 before providing the virtual images to the electronic contact lenses 110 for display. Additionally, the accessory device 212 may configure various aspects of the electronic contact lens 110 that affect its operation. For example, the accessory device 212 may configure parameters of motion sensors in the electronic contact lenses 110.

The lens control module 220 includes a tracking module 230, a communication module 228 and an image generator 226. The image generator 226 generates virtual images for display by the femtoprojector 120. The virtual images may be text, graphics or control elements that are projected by the femtoprojector 120 onto the user's eye 100. The virtual images may be oriented based on in part on the tracked orientations of the eyes so as to provide the user with the perception of a stable image.

The communication module 228 facilitates communication with external systems to acquire information for displaying by the electronic contact lenses 110, to perform external processing relating to orientation tracking, or to control external systems based on interactions using the electronic contact lenses 110.

The tracking module 230 obtains sensor measurements from the motion sensors of the electronic contact lenses 110 and generates orientation estimates for both eyes. The measurements from the sensors are often subject to noise, thus making individual measurements prone to inaccuracies. However, by capturing a sequence of measurements over time from both electronic contact lenses, and by applying an eye model that describes correlations and constraints associated with the expected motions of the eyes, the tracking module 230 can generate accurate orientation estimates even in the presence of noise. The orientation estimates can be used to stabilize projected images, to detect eye gestures, to adjust a control function of the electronic contact lenses 110, or initiate other actions as described in further detail below.

Figure 3:
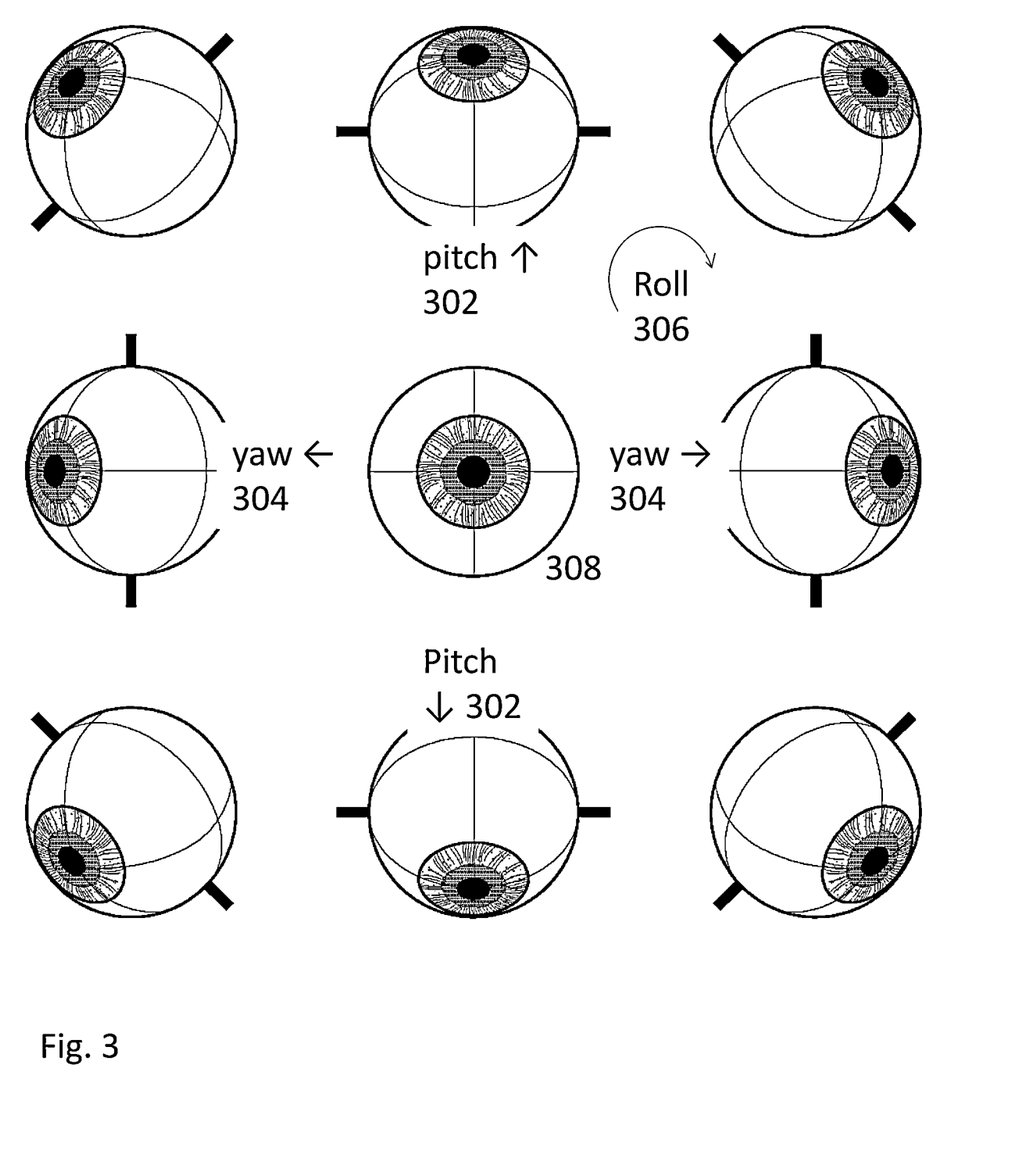
FIG. 3 illustrates example changes in pitch, yaw, and roll of an eye that can be tracked based on sensor measurements from an electronic contact lens.

FIG. 3 is a diagram illustrating possible motions of a human eye. The eye can generally rotate with three degrees of freedom with its orientation described by pitch 302, yaw 304, and roll 306. In this context, pitch 302 is a measure of vertical eye motion about a horizontal axis, yaw 304 is a measure of horizontal eye motion about a vertical axis, and roll 306 is a measure of torsional eye motion about the line of sight. In normal human eye movement, the eye will only assume a limited number of orientations. In other words, many arbitrary combinations of pitch 302, yaw 304, and roll 306 are not actually possible. For example, in normal human eye movement, roll 306 is constrained as a fixed function of pitch 302 and yaw 304 such that the roll can be computed if the pitch 302 and yaw 304 are known. Furthermore, with some exceptions, the eye will only assume orientations that can be reached from a "primary position" 308 (a position looking straight ahead when the head is fixed) by a single rotation about an axis in a plane orthogonal to the line of sight when the eye. In FIG. 3, the position in the center 308 represents the primary position and the page represents the plane orthogonal to the line of sight. The remaining illustrated orientations are all achievable because they can be reached from the primary position 308 by a rotation about an axes (illustrated by the solid lines) within the plane of the page. This principle is known as Listing's Law.

More complex constraints on eye movement also exist, some of which describe the various exceptions to Listing's Law. For example, Listing's Half-Angle rule describes how the eye moves when the eye starts a rotation from an eccentric eye position that is not the primary position 308. A binocular extension to Listing's Law describes how roll 306 of the eye changes when the eye converges on a near object compared to an object at optical infinity. Additional rules describe constraints on eye movements in other situations such as during vestibulo-ocular reflex motion.

Besides the single eye constraints described above, there are also correlations and constraints that describe the possible orientations and motions of the left and right eyes relative to each other. For example, the pitch 302 of the left eye will generally match the pitch 302 of the right eye within some limited deviation range. The difference in yaw 304 of the left and right eye, referred to as vergence, is constrained to a limited range and directly relates to the focal distance of an object. The relative roll 306 of the left and right eyes are also related with the difference in roll generally being described by a function of pitch and yaw (within some limited deviation). The tracking module 230 described herein utilizes these constraints and correlations that describe how an individual eye can move and how a pair of eyes can move relative to each other to generate orientation estimates for both eyes in the presence of potentially noisy sensor measurements.

Figure 4:
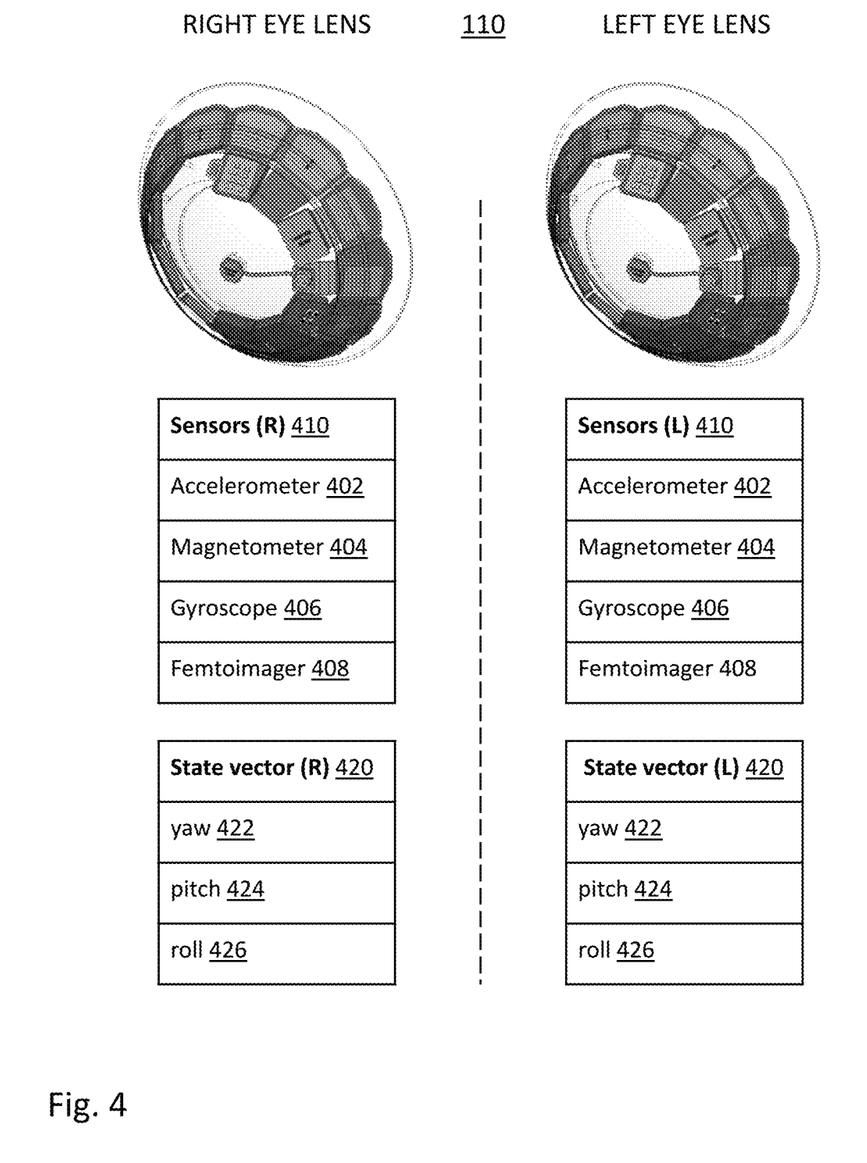
FIG. 4 illustrates an example technique for estimating the orientations of the eyes independently using a pair of electronic contact lenses.

FIG. 4 illustrates a first example of a technique for estimating orientations of left and right eyes based on sensor measurements from respective electronic contact lenses 110. In this example, each electronic contact lens 110 includes a set of sensors 410 such as an accelerometer 402, a magnetometer 404, a gyroscope 406, and a femtoimager 408. These sensors 410 capture respective measurements associated with movement of the left eye and the right eye. For example, the accelerometer 402 measures acceleration along three axes, the gyroscope 406 measures angular rate of change along the three axes, and the magnetometer 404 measures magnetic field strength along the three axes. The femtoimagers 408 can be used to generate measurements relating to rotation and translation. For example, sequential comparisons of images may be analyzed to detect features that may be tracked to derive relevant motion data. Separate right eye and left eyes filters filter the respective left and right eye sensor measurements to generate respective left and right eye state vectors 420 estimating the yaw 422, pitch 424, and roll 426 of each eye. In this technique, the orientations of each eye are estimated independently of each other to generate independently estimated state vectors 420.

The filters may be implemented as Kalman filters or other types of recursive Bayesian estimators. The filters provide the best estimate of each eye's orientation given all available information from the sensor measurements. In an example implementation, left and right eye filters update state vectors representing respective eye orientations at each time step. Each filter generates an updated state vector based on the current state vector, the filter parameters (representing the eye model that predicts how each eye's orientation changes over time), and sensor measurements captured during the current time step.

Figure 5:
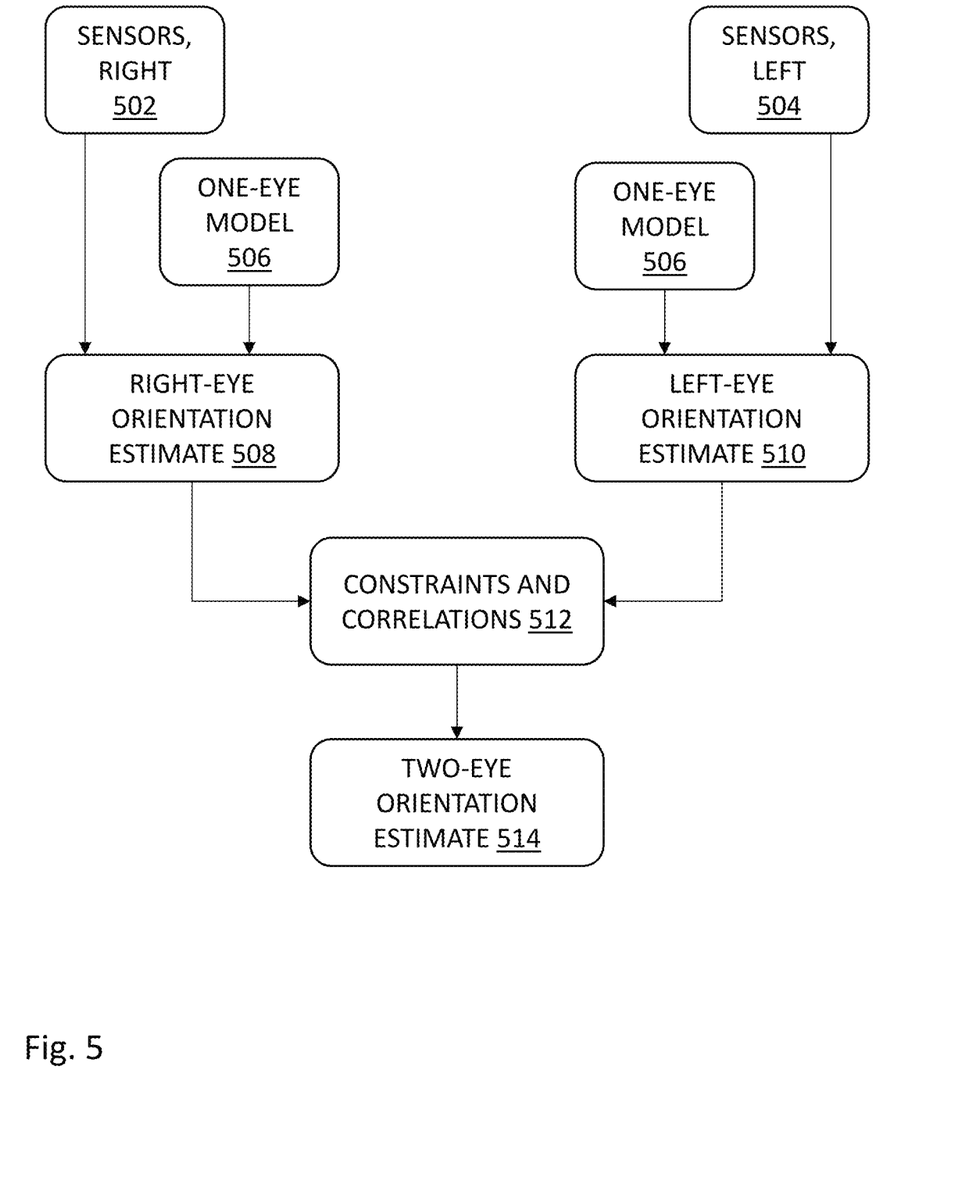
FIG. 5 is a flow diagram illustrating an example process for performing a two-eye orientation estimate by combining independently estimated orientations for each eye.

FIG. 5 illustrates an example of a process for generating estimated orientations of both left and right eyes based on independent estimated orientations of each eye. In this process, a set of right eye sensors 502 (such as those illustrated in FIG. 4) obtain measurements associated with motion of the right eye and a set of left eye sensors 504 (such as those illustrated in FIG. 4) obtain measurements associated with motion of the left eye. A right-eye orientation estimate 508 is performed based on the right eye sensor measurements from the right eye sensors 502 and a one-eye model 506 that describes single eye motion. A left-eye orientation estimate 510 is similarly performed based on the left eye sensor measurements from the left eye sensors 504 and the one-eye model 506. Here, the one-eye model may comprise filter parameters of a filter (e.g., a Kalman filter) that are applied to a sequence of measurements to generate the respective orientation estimates 508, 510 as described above. The two estimates 508, 510 may then be further refined by enforcing the various constraints and correlations 512 of relative eye motion, such as Listing's Law and its extensions described above to generate a two-eye estimate 514. In other words, the constraints and correlations 512 are applied after the individual eye orientation estimates are obtained from the filtering step. Here, the constraints and correlations 512 describe the permissible relative motion of the eyes based on a two-eye motion model. The constraints and correlations 512 may be implemented as parameters of a two-eye filter (e.g., another Kalman filter or other type of filter) that generates the two-eye orientation estimate based on the individual single eye estimates. For example, the tracking module 230 may adjust an initially estimated pitch of one eye to be within a predefined noise range of the estimated pitch of the second eye. Furthermore, the tracking module 230 may adjust a yaw of one eye to be within a predefined range of a yaw of the second eye (which may be based on a combination of a predefined noise range and a predefined vergence range). In another example, the tracking module 230 may adjust a roll of one eye to be within a predefined noise range of a roll of the second eye, which may in turn be adjusted to be within a predefined noise range of a function of the pitch and yaw.

Figure 6:
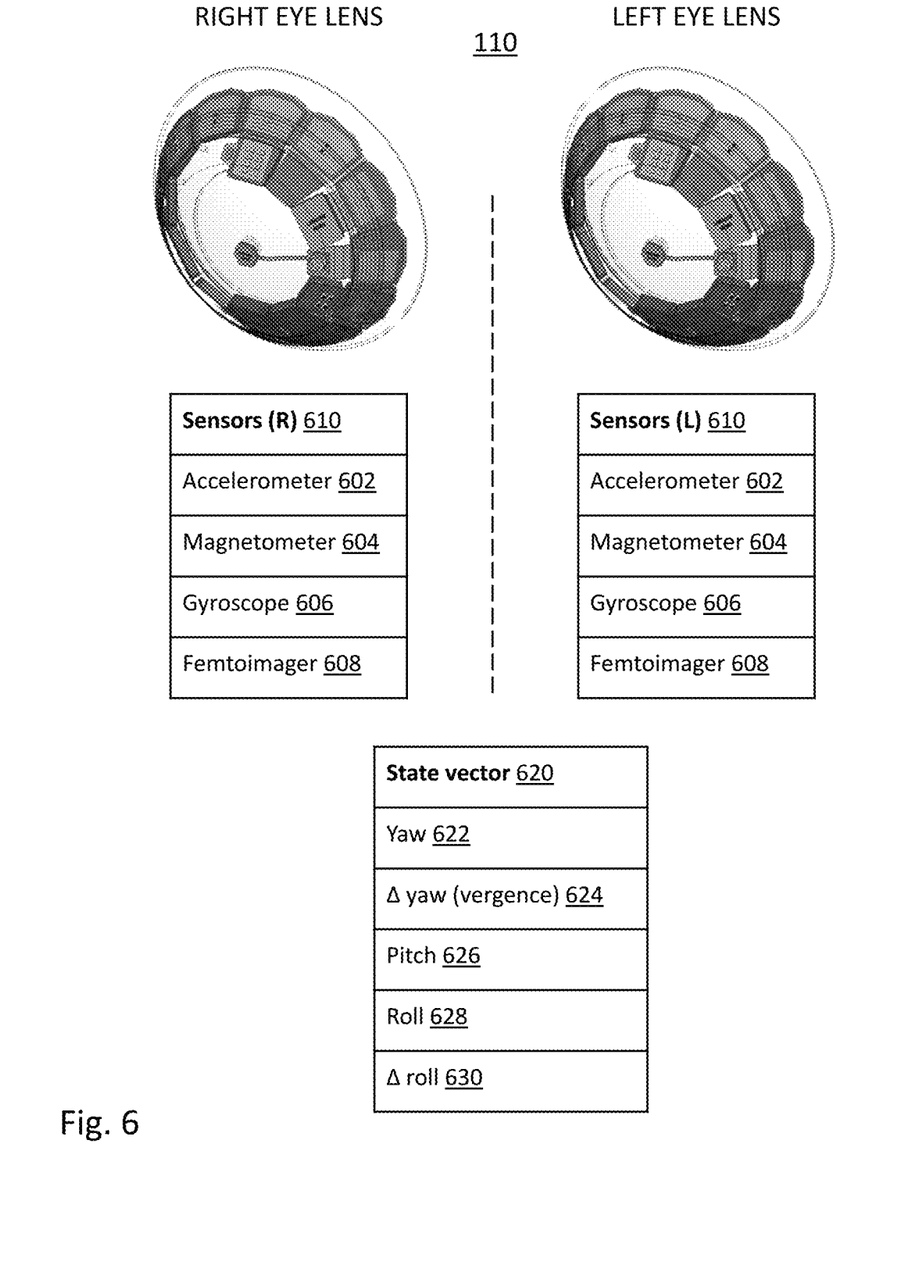
FIG. 6 illustrates an example technique for estimating the orientation of both eyes using a combined estimation model that operates on sensor measurements from a pair of electronic contact lenses.

FIG. 6 illustrates another technique for estimating orientations of the left and right eyes. In this example, the sensor measurements from the left and right eye sensors 610 (e.g., accelerometer 602, magnetometer 604, gyroscope 606, femtoimager 608) are input to a single filter that models both the individual constraints on motion of each eye and constraints and correlations relating to the relative motion of the eyes. In this example, the filter produces a single state vector 620 describing the orientations of both eyes. For example, the state vector 620 includes a yaw 622 of one eye (which could be either the left or right eye), a vergence 624 representing the difference in yaw between the eyes, a roll 628 of one eye (which could be either the left or right eye), a difference in roll 630 between the eyes, and a pitch 626 (which is estimated to be the same for both eyes). The filter takes sensor measurement from both eyes as inputs and applies parameters based on a two-eye motion model to apply the constraints and correlations as part of the filter operation when generating the predicted eye orientations.

In an alternative embodiment, the left and right electronic contact lenses 110 may each include disparate sets of sensors. For example, in one implementation, one of the lenses 110 may include only a subset of the sensors included in the other lens 110. In another implementation, the electronic contact lenses 110 include different non-overlapping sets of sensors. For example, one electronic contact lens 110 may include only an accelerometer and gyroscope, while the other electronic contact lens 110 includes a magnetometer and femtoimager. In yet another implementation, sensors in different electronic contact lenses 110 may provide measurements relating to different axes of motion. For example, one electronic contact lens 110 may include an accelerometer that measures acceleration along two axes while the other lens 110 includes an accelerometer that measures acceleration along a third axis. Here, the distribution of sensors may enable measurement of yaw independently in both electronic contact lenses 110 (since yaw may differ between the eyes), while enabling pitch measurement in only one electronic contact lens 110 (since pitch is generally the same in both eyes). Regardless of the distribution of sensors, the filter may operate to estimate the orientations of both eyes using the available sensor measurements as inputs together with parameters derived from the two-eye model.

In further examples, a more limited set of measurements may be taken depending on the desired elements of the output state vector. For example, for some applications (as described below), an estimate of vergence is the only desired element, and it is not necessary to estimate other elements of the eye orientations. In this case, a more limited set of measurements is sufficient to enable accurate vergence estimation. For example, in an embodiment, electronic contact lenses 110 include only accelerometers and magnetometers without other sensors for the purpose of vergence estimation. In another example, the filter may be applied to a set of difference values between the first and second state sensor measurements from each eye instead of directly to the measurements.

Figure 7:
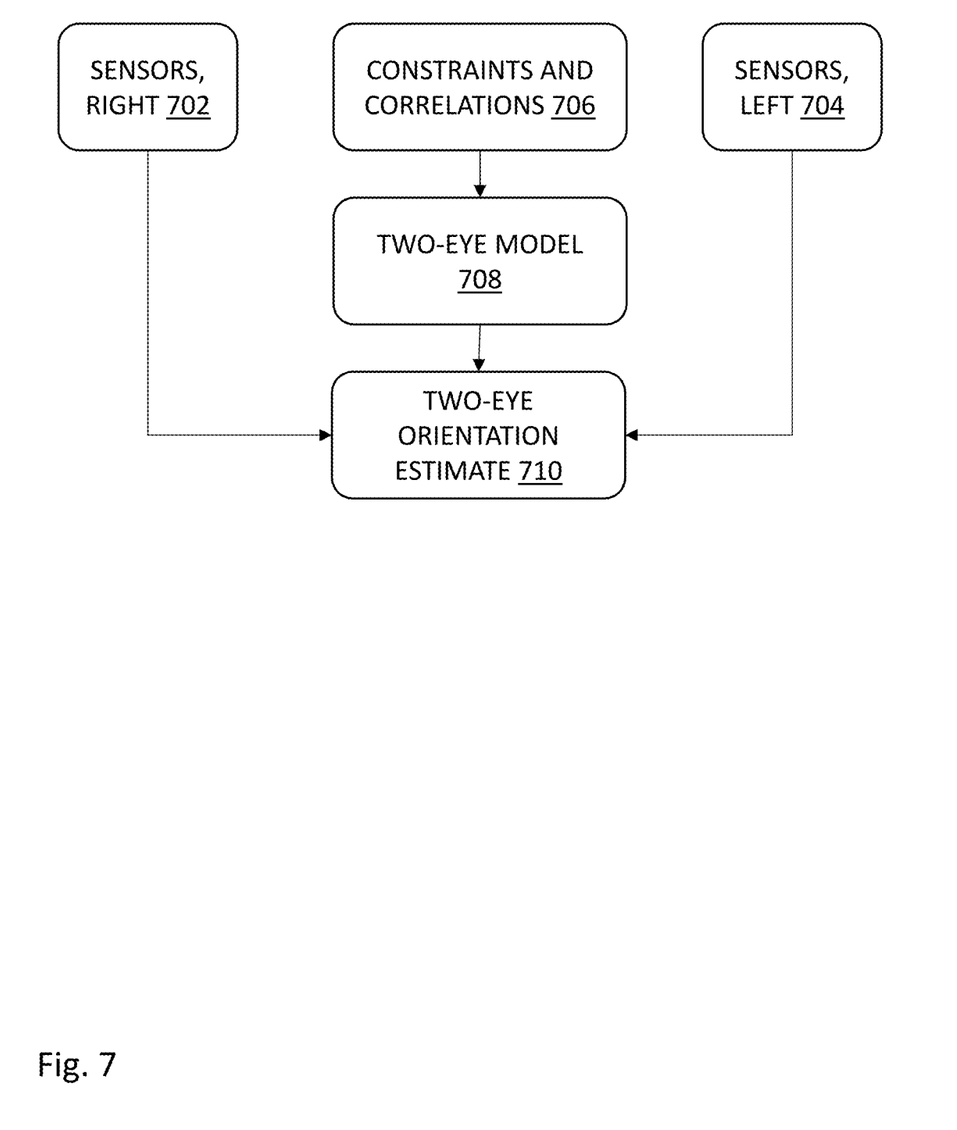
FIG. 7 is a flow diagram illustrating an example process for performing a two-eye orientation estimate using a two-eye estimation model that operates on sensor measurements from a pair of electronic contact lenses.

FIG. 7 illustrates an example of a process for generating estimated orientations of both left and right eyes using a two-eye model. In this process, a set of right eye sensors 702 (such as those illustrated in FIG. 6) obtain measurements associated with motion of the right eye and a set of left eye sensors 704 (such as those illustrated in FIG. 6) obtain measurements associated with motion of the left eye. A set of constraints and correlations 706 provide parameters to a two-eye model 708 that describes how the eyes may move individually and relative to each other. A two-eye orientation estimate 710 is performed based on the right eye sensor measurements from the right eye sensors 702, the left eye sensor measurements from the left eye sensors 704, and the two-eye model 708 to generate estimated orientations 710 for both eyes. The two-eye orientation estimate 710 may be performed by applying a filter (e.g., a Kalman filter) to the respective right and left eye measurements in which the two-eye model 708 comprises a set of filter parameters that models the motion of a set of eyes based on the constraints and correlations 706. In this example, a single filter may be applied that generates the estimated output orientations of both eyes in a single operation. The filter furthermore applies the constraints and correlations 706 as part of the filtering operation so that the estimates for each eye are each dependent on both the left and right eye measurements.

Accurate detection of eye orientation has various applications relating to augmented reality displays using the electronic contact lenses 110. For example, by accurately tracking eye orientations, projected images may be shifted to compensate for changes in orientation such that the image appears fixed to the user in a world frame. This technique thus stabilizes the images even the presence of small eye movements.

Figure 8:
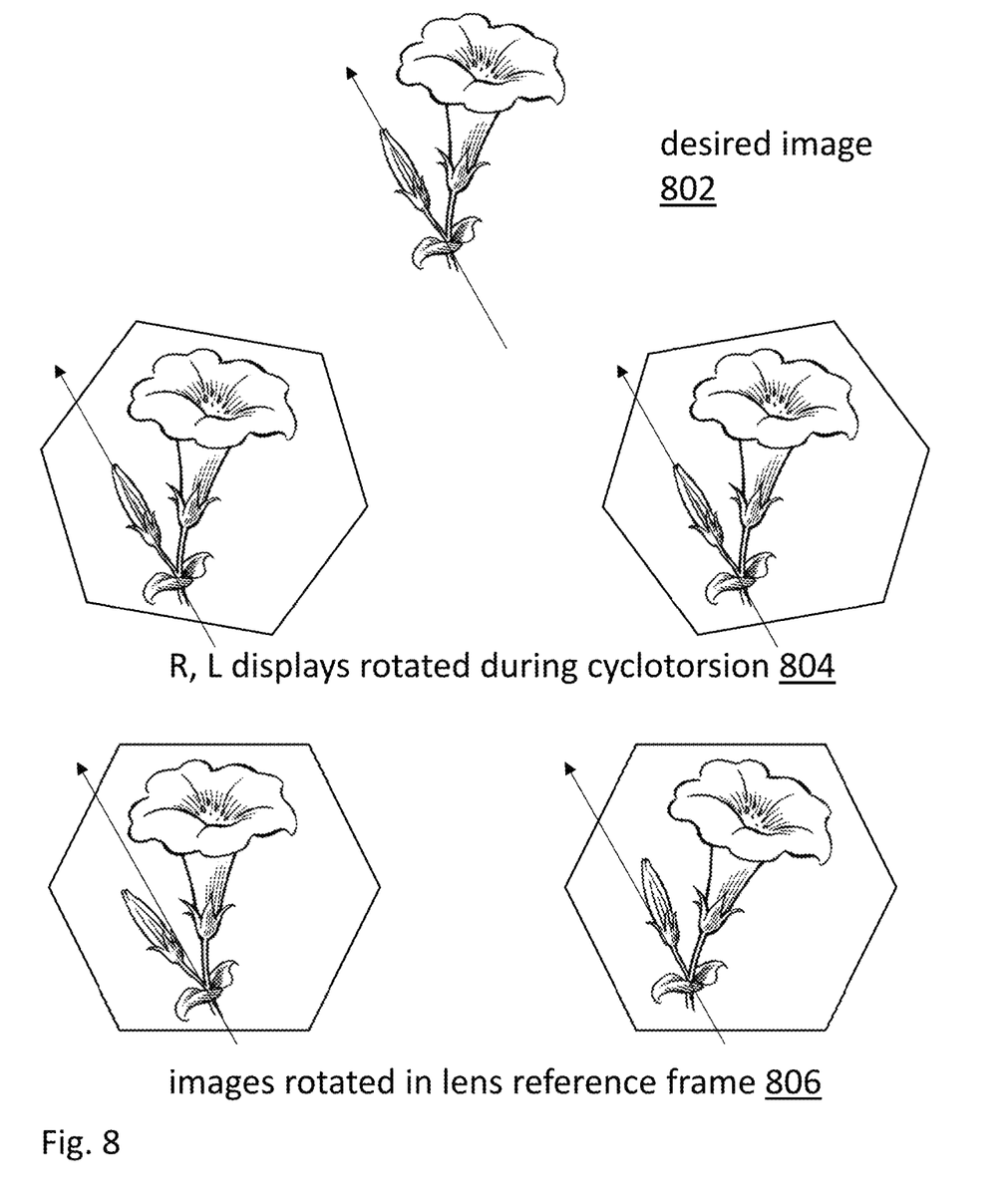
FIG. 8 is a diagram illustrating a technique for rotating projected images based on estimated relative orientations of the eyes.

FIG. 8 illustrates an example technique for adjusting display of augmented reality images projected by a set of electronic contact lenses 110 based on estimated eye orientations. In FIG. 8, the desired image 802 represents the intended orientation of the object as it should be perceived by the user. If both eyes are perfectly centered in the eye socket, the relative roll between the eyes should be zero or negligible and identical images can be displayed by femtoimagers in both electronic contact lenses 110 that are consistent with the desired orientation. However, because the relative roll of the eyes changes as a function of pitch and yaw, projecting identical images on both eyes when the eyes are not centered in the socket will result in perceived misalignment due to the relative roll. To compensate for the relative roll, the images may be rotated 804 in an amount corresponding to the detected roll of each eye using the orientation estimation techniques described above. The resulting images 806 that are rotated in the lens reference frame will appear aligned in the correct orientations from the user's perspective. For this purpose, the relative roll of the eyes can be estimated much more accurately and with better noise rejection using the above-described techniques relative conventional techniques that rely only on directly measuring roll.

The electronic contact lens system may also trigger an action in response to detecting a difference in relative roll between the eyes. As described above, the relative roll is zero or negligible when the eyes are centered in their sockets. Thus, detecting a relative roll indicates that the user's gaze has deviated from the centered position. The electronic contact lens system can recognize eye gestures based on detected patterns in the relative roll and trigger actions in response. A specific eye gesture may be detected when the relative roll goes from approximately zero to a threshold value, indicative of the user changing from a straight-ahead gaze to an off-center gaze (e.g., up and to the left). The detected movements may be filtered to distinguish between deliberate and inadvertent movements, for example, by only triggering a detection when the difference in relative roll is present for at least a threshold time period. In another example, a gesture may be detected when the eyes move to an off-center gaze position for a threshold time period and then return to the center position. This gesture may be used to trigger various actions such as activating or deactivating a contact lens visual user interface.

The above-described technique provides one example of indirectly estimating head motion based only on eye tracking (i.e., without directly sensing head movement). Other kinds of head motion can also be inferred from detecting eye motions that are known only to occur during certain kinds of head movements.

The orientation estimates described above can be similarly applied to adapt other aspects of projected images based on the estimated orientations. For example, a relative translation can be applied to images projected on the left and right eye to compensate for detected relative yaw (vergence) between the eyes. Furthermore, because the relative yaw of the eyes relates to the focal distance, images may be projected to appear at a particular apparent depth based on the detected vergence.

Accurate orientation estimates can also enable solutions for presbyopia. For example, distances to objects on which a user is fixating can be estimated based on the estimated vergence between the eyes. The distance estimate can then be used to adjust an optical power of a variable focus of the electronic contact lenses 110. The electronic contact lenses 110 can therefore supplement or replace the eye's natural ability to accommodate these changes for individuals with varying degrees of presbyopia.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software and/or combinations thereof. Implementations can be implemented in a computer program product tangibly embodied in a non-transitory computer-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system for estimating eye orientation comprising:
    a first contact lens including one or more sensors for sensing first sensor measurements associated with the first contact lens for a first eye of an individual, and a first projector for projecting a first image onto the first eye;
    a second contact lens including one or more sensors for sensing second sensor measurements associated with the second contact lens for a second eye of the individual, and a second projector for projecting a second image onto the second eye; and
    a non-transitory computer-readable storage medium to store instructions executable by a processor, the instructions when executed causing the processor to perform steps including:
        obtaining one or more filters including filter parameters that model constraints, including Listing's law, on individual motions of the first eye and the second eye and on relative motion between the first eye and the second eye;
        configuring a first image orientation for projecting the first image onto the first eye;
        configuring a second image orientation for projecting the second image onto the second eye;
        obtaining the first and second sensor measurements;
        applying the one or more filters to the first and second sensor measurements to estimate first and second lens orientations of the first and second contact lenses based on the first and second sensor measurements and the filter parameters, such that the first and second lens orientations satisfy the constraints; and detecting a change in relative roll between the first and second contact lenses from the first and second lens orientations; and updating the first image orientation of the first image and updating the second image orientation of the second image to apply respective rotations to the first and second images to compensate for the change in relative roll.

2. The system of claim 1, wherein applying the one or more filters comprises:

applying a first filter derived from a one-eye model to the first sensor measurements to estimate an initial first lens orientation of the first contact lens based on the first sensor measurements;

independently of the first filter, applying a second filter derived from the one-eye model to the second sensor measurements to estimate an initial second lens orientation of the second contact lens based on the second sensor measurements; and applying a set of constraints based on a two-eye model to the initial first lens orientation and the initial second lens orientation to obtain the first lens orientation and the second lens orientation.

3. The system of claim 2, wherein applying the set of constraints comprises:

adjusting at least one of the initial first and second lens orientations to constrain a pitch of the first lens orientation to be within a predefined noise range of a pitch of the second lens orientation.

4. The system of claim 2, wherein applying the set of constraints comprises:

adjusting at least one of the initial first and second lens orientations to constrain a yaw of the first lens orientation to be within a predefined range of a yaw of the second lens orientation, the predefined range based on a combination of a predefined noise range and a predefined vergence range.

5. The system of claim 2, wherein applying the set of constraints comprises:

adjusting at least one of the initial first and second lens orientations to constrain a roll of the first lens orientation to be within a predefined noise range of a function of a roll, pitch, and yaw of the second lens orientation.

6. The system of claim 1, wherein applying the one or more filters comprises:

applying a single filter to both the first and second sensor measurements to estimate the first and second lens orientations of the first and second contact lenses, the single filter applying a two-eye model describing relative motion of both eyes to estimate each of the first and second lens orientations as a function of both the first and second sensor measurements.

7. The system of claim 6, wherein applying the one or more filters comprises:

determining a set of difference values between the first and second sensor measurements; and applying the single filter to the set of difference values to estimate both the first and the second lens orientations of the first and second contact lenses based on a combination of the first and second sensor measurements.

8. The system of claim 1, wherein the one or more sensors comprise at least one of the following sensor types: an accelerometer, a gyroscope, a magnetometer, and a femto-imager.

9. The system of claim 8, wherein the one or more sensors of the first contact lens include at least one different type of sensor from the one or more sensors of the second contact lens.

10. The system of claim 1, wherein the instructions when executed further cause the processor to perform steps of:

estimating a vergence between the first lens orientation and the second lens orientation; and initiating an action based on the estimated vergence.

11. The system of claim 10, wherein initiating the action comprises:

predicting a distance to an object of interest based on the estimated vergence.

12. The system of claim 10, wherein initiating the action comprises:

automatically adjusting an optical power of a variable focus of the first and second contact lenses based on the estimated vergence.

13. The system of claim 1, wherein the instructions when executed further cause the processor to perform steps of:

recognizing an eye gesture based on the change in relative roll;

identifying an action associated with the recognized eye gesture; and initiating the action.

14. The system of claim 13, wherein initiating the action comprises:

controlling a remote device based on the eye gesture.

15. The system of claim 1, where the one or more filters comprises a Kalman filter.

16. A method for estimating eye orientation comprising:

obtaining, by a first contact lens for a first eye of an individual, first sensor measurements associated with motion of the first contact lens;

obtaining, by a second contact lens for a second eye of the individual, second sensor measurements associated with motion of the second contact lens;

configuring a first image orientation for projecting a first image onto the first eye by a first projector of the first contact lens;

configuring a second image orientation for projecting a second image onto the second eye by a second projector of the second contact lens;

obtaining one or more filters including filter parameters that model constraints, including Listing's law, on individual motions of the first eye and the second eye and on relative motion between the first eye and the second eye;

applying one or more filters to the first and second sensor measurements to estimate first and second lens orientations of the first and second contact lenses based on the first and second sensor measurements and the filter parameters, such that the first and second lens orientations satisfy the constraints; and detecting a change in relative roll between the first and second contact lenses from the first and second lens orientations; and updating the first image orientation of the projected first image and updating the second image orientation of the second image to apply respective rotations to the first and second images to compensate for the change in relative roll.

17. A non-transitory computer-readable storage medium storing instructions executable by a processor, the instructions when executed causing the processor to perform steps including:

obtaining, by a first contact lens for a first eye of an individual, first sensor measurements associated with motion of the first contact lens;

obtaining, by a second contact lens for a second eye of the individual, second sensor measurements associated with motion of the second contact lens;

configuring a first image orientation for projecting a first image onto the first eye by a first projector of the first contact lens;

configuring a second image orientation for projecting a second image onto the second eye by a second projector of the second contact lens;

obtaining one or more filters including filter parameters that model constraints, including Listing's law, on individual motions of the first eye and the second eye and on relative motion between the first eye and the second eye;

applying one or more filters to the first and second sensor measurements to estimate first and second lens orientations of the first and second contact lenses based on the first and second sensor measurements and the filter parameters, such that the first and second lens orientations satisfy the constraints; and detecting a change in relative roll between the first and second contact lenses from the first and second lens orientations; and updating the first image orientation of the projected first image and updating the second image orientation of the second image to apply respective rotations to the first and second images to compensate for the change in relative roll.

\* \* \* \* \*